(12) United States Patent
Lee et al.

(10) Patent No.: US 10,275,401 B2
(45) Date of Patent: Apr. 30, 2019

(54) WRITE ACCESS CONTROL IN A DATABASE

(71) Applicant: SAP SE, Walldorf (DE)

(72) Inventors: Chul Won Lee, Seoul (KR); Kyu Hwan Kim, Seoul (KR); Marcel Birn, Karlsruhe (DE); Jane Jung Lee, Seoul (KR); Di Wu, Seoul (KR); Juchang Lee, Seoul (KR); Zhi Qiao, Xi'an (CN)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 15/364,649

(22) Filed: Nov. 30, 2016

(65) Prior Publication Data

US 2018/0150504 A1     May 31, 2018

(51) Int. Cl.
| | |
|---|---|
| *G06F 16/27* | (2019.01) |
| *G06F 16/23* | (2019.01) |
| *G06F 16/2455* | (2019.01) |
| *G06F 16/903* | (2019.01) |

(52) U.S. Cl.
CPC ........ *G06F 16/2379* (2019.01); *G06F 16/235* (2019.01); *G06F 16/2322* (2019.01); *G06F 16/2358* (2019.01); *G06F 16/2455* (2019.01); *G06F 16/27* (2019.01); *G06F 16/903* (2019.01)

(58) Field of Classification Search
CPC ......... G06F 17/30377; G06F 17/30964; G06F 17/30477; G06F 17/30283; G06F 17/30365; G06F 17/30353; G06F 17/30368; G06F 16/2379; G06F 16/27; G06F 16/235; G06F 16/2322; G06F 16/2358; G06F 16/2455; G06F 16/903

See application file for complete search history.

(56) References Cited

U.S. PATENT DOCUMENTS

| | | | | |
|---|---|---|---|---|
| 5,930,795 | A * | 7/1999 | Chen | G06F 17/30474 |
| 2005/0055445 | A1* | 3/2005 | Gupta | G06F 11/2074 |
| | | | | 709/226 |
| 2007/0239798 | A1* | 10/2007 | Shringi | G06F 17/30371 |
| 2009/0125563 | A1 | 5/2009 | Wong et al. | |
| 2009/0240608 | A1 | 9/2009 | Mashinter | |
| 2016/0147809 | A1* | 5/2016 | Schreter | G06F 11/1446 |
| | | | | 707/746 |

OTHER PUBLICATIONS

European Patent Office, Extended European Search Report, Appl. No. 17001369.2, dated Feb. 15, 2018.
Kataria, Shipra, Sapra, Pooja; A Novel Approach for Rank Optimization Using Search Engine Transaction Logs; Proceedings of the 3rd International Conference on Computing for Sustainable Global Development; pp. 3387-3393; Mar. 2016.

\* cited by examiner

*Primary Examiner* — Richard L Bowen
*Assistant Examiner* — Maher N Algibhah
(74) *Attorney, Agent, or Firm* — Jones Day

(57) ABSTRACT

A computer implemented method for initializing a first image of a first database from a recovery image; modifying the first image of the first database by replaying transaction logs of a second database; establishing a connection with a client; receiving a query via the connection, the query including a transaction to be executed on the first database; and rejecting the query when the transaction would cause any one of: updating of the first image of the first database; generating a new transaction log; and modifying the recovery image. Related apparatus, systems, techniques and articles are also described.

20 Claims, 8 Drawing Sheets

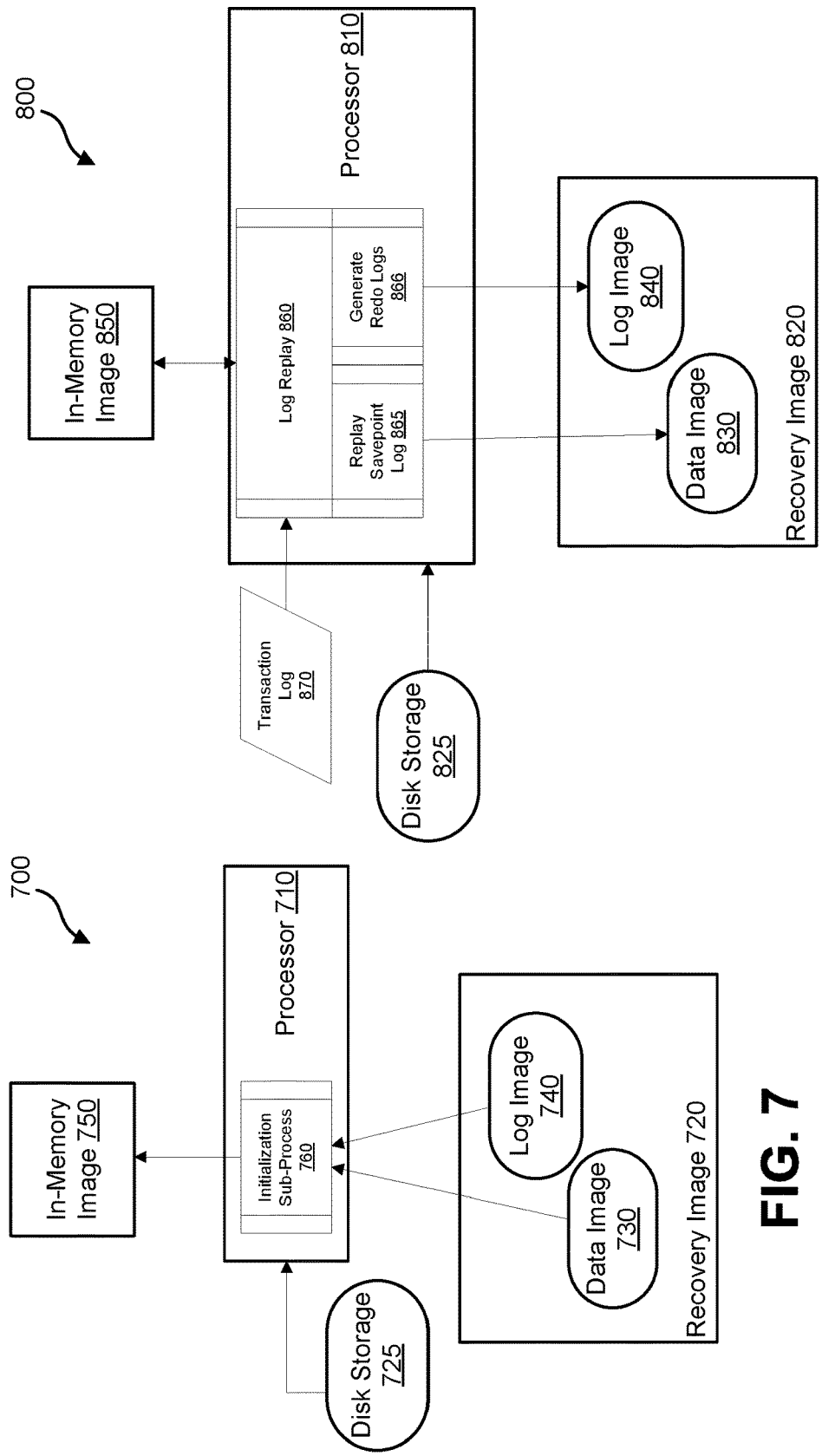

WRITE ACCESS CONTROL IN A DATABASE

TECHNICAL FIELD

The subject matter described herein relates to database systems and more particularly to database systems employing a primary database and a secondary, hot-standby, database.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

Database systems rely on data replication and synchronization to maintain continuous system availability. Typically, in such a system, a complete copy of the database is stored at a first datacenter and the same complete copy of the database is stored at a second datacenter. The first and second datacenters may be in different locations or they may be in the same location. Since the data in the second datacenter needs to be the same as the data in the first datacenter, a synchronization mechanism is typically employed to handle synchronization of the data. If there is a failure associated with the first datacenter, the system can switch to using the database at the second datacenter without significant issues.

Since the second datacenter may be asked to perform all of the same tasks as the first datacenter, typically, the second datacenter has the same hardware and software requirements as the first datacenter. Sometimes more than two datacenters may be included within a database.

SUMMARY

A computer-implemented method is provided. The method comprises initializing a first image of a first database from a recovery image, modifying the first image of the first database by replaying transaction logs of a second database, establishing a connection with a client, receiving a query via the connection including a transaction to be executed on the first database, and rejecting the query when the transaction would cause any one of updating of the first image of the first database, generating a new transaction log, and modifying the recovery image.

These aspects and other embodiments may include one or more of the following features. Executing a query including a write transaction causes creating one or more temporary tables in the first database associated with the connection, modifying one or more temporary tables of the database associated with the connection, and modifying the data contained within one or more tables of the first database, and assigning a small value to the transaction commit timestamp associated with the write transaction such that the small number is guaranteed to be smaller than the global commit timestamp, and visibility of a transaction to a later executed query in the first database is at least in part determined by whether a transaction commit timestamp associated with the write transaction is less than a global commit time stamp of the first database. The method may further comprise establishing a second connection with a second client, such that the temporary tables of the first database associated with the connection are not visible to queries associated with the second connection. The method may further comprise deleting temporary tables of the first database associated with the connection when the connection is disconnected. The method may further comprise that the temporary tables associated with a connection are maintained until a time substantially concomitant with the connection being disconnected, that the temporary tables are logically distinct from the first image of the database, and that transactions executed on any temporary table associated with any connection are prohibited from causing any modification to any recovery image associated with the first database. The method may further comprise updating the recovery image in response to replay of a savepoint log when replaying transaction logs from the second database, the recovery image includes one or more data images and one or more log images, which are updated during database runtime based on the first image of the first database, and that the one or more log images are updated when new transaction logs are received from the second database. The method may further comprise replicating transactions executed in the second database, such that each replicated transaction has an associated transaction identification number assigned by the second database from a range of numbers, the method further comprising reserving a portion of the range of numbers to serve as temporary table transaction identification numbers in the first database; and assigning a reserved transaction identification number selected from the portion of the range of numbers to a write transaction executed on one or more temporary tables associated with the connection; deleting the one or more temporary tables of the first database associated with the connection when the connection is disconnected; and assigning the reserved transaction identification number to a second transaction associated with a second connection after deleting the one or more temporary tables of the first database associated with the connection.

In other embodiments, a non-transitory computer readable storage medium embodying programming instructions for performing a method is provided. The method comprises initializing a first image of a first database from a recovery image, modifying the first image of the first database by replaying transaction logs of a second database, establishing a connection with a client, receiving a query via the connection, the query including a transaction to be executed on the first database, and rejecting the query the transaction would cause any one of updating of the first image of the first database, generating a new transaction log, and modifying the recovery image.

These aspects and other embodiments may include one or more of the following features. Executing a query including a write transaction causes creating one or more temporary tables in the first database associated with the connection, modifying one or more temporary tables of the database associated with the connection, and modifying the data contained within one or more tables of the first database, and assigning a small value to the transaction commit timestamp associated with the write transaction, such that the small number is guaranteed to be smaller than the global commit timestamp, and the visibility of a transaction to a later executed query in the first database is at least in part determined by whether a transaction commit timestamp associated with the write transaction is less than a global commit time stamp of the first database. The method may further comprise establishing a second connection with a second client, such that the temporary tables of the first database associated with the connection are not visible to queries associated with the second connection. The method provided by the programming instructions embodied in the non-transitory computer readable storage medium may further comprise deleting temporary tables of the first database associated with the connection when the connection is disconnected. The temporary tables associated with a connection may be maintained until a time substantially concomitant with the connection being disconnected, that the temporary tables are logically distinct from the first image of the database, and transactions executed on any temporary table associated with any connection are prohibited from causing any modification to any recovery image associated with the first database. The recovery image may be updated in response to replay of a savepoint log when replaying transaction logs from the second database, the recovery image includes one or more data images and one or more log images, which are updated during database runtime based on the first image of the first database, and that the one or more log images are updated when new transaction logs are received from the second database. The method provided by the programming instructions embodied in the non-transitory computer readable storage medium may further comprise replicating transactions executed in the second database, such that each replicated transaction has an associated transaction identification number assigned by the second database from a range of numbers, the method further comprising reserving a portion of the range of numbers to serve as temporary table transaction identification numbers in the first database; and assigning a reserved transaction identification number selected from the portion of the range of numbers to a write transaction executed on one or more temporary tables associated with the connection; deleting the one or more temporary tables of the first database associated with the connection when the connection is disconnected; and assigning the reserved transaction identification number to a second transaction associated with a second connection after deleting the one or more temporary tables of the first database associated with the connection.

In other embodiments, a computer system is provided. The computer system comprises at least one processor; and a non-transitory computer readable media having computer executable instructions that cause the computer system to initialize a first image of a first database from a recovery image, modify the first image of the first database by replaying transaction logs of a second database, establish a connection with a client, receive a query via the connection, where the query includes a transaction to be executed on the first database, and reject the query the transaction would cause any one of updating of the first image of the first database, generating a new transaction log, and modifying the recovery image.

These aspects and other embodiments may include one or more of the following features. Executing a query including a write transaction causes creating one or more temporary tables in the first database associated with the connection, modifying one or more temporary tables of the database associated with the connection, and modifying the data contained within one or more tables of the first database, and assigning a small value to the transaction commit timestamp associated with the write transaction, and the small number is guaranteed to be smaller than the global commit timestamp, and visibility of a transaction to a later executed query in the first database is at least in part determined by whether a transaction commit timestamp associated with the write transaction is less than a global commit time stamp of the first database. The instructions may further cause the computer system to establish a second connection with a second client, such that the temporary tables of the first database associated with the connection are not visible to queries associated with the second connection. The instructions may further cause the computer system to delete temporary tables of the first database associated with the connection when the connection is disconnected. The temporary tables associated with a connection may be maintained until a time substantially concomitant with the connection being disconnected, that the temporary tables are logically distinct from the first image of the database, and transactions executed on any temporary table associated with any connection are prohibited from causing any modification to any recovery image associated with the first database. The instructions may further cause the computer system to update the recovery image in response to replay of a savepoint log when replaying transaction logs from the second database, the recovery image includes one or more data images and one or more log images, which are updated during database runtime based on the first image of the first database, and that the one or more log images are updated when new transaction logs are received from the second database. The instructions may further cause the computer system to replicate transactions executed in the second database, such that each replicated transaction has an associated transaction identification number assigned by the second database from a range of numbers, reserve a portion of the range of numbers to serve as temporary table transaction identification numbers in the first database; and assign a reserved transaction identification number selected from the portion of the range of numbers to a write transaction executed on one or more temporary tables associated with the connection; delete the one or more temporary tables of the first database associated with the connection when the connection is disconnected; and assign the reserved transaction identification number to a second transaction associated with a second connection after deleting the one or more temporary tables of the first database associated with the connection.

In various other embodiments a system, non-transitory medium, and/or a computer implemented method are provided, which include creating a temporary table in a first database system, receiving a write transaction via a connection, evaluating the write transaction to determine that the write transaction will not cause any one of the following prohibited database modifications: updating of a first image of the first database, generating a new transaction log associated with the first database, modifying any persistent data volume associated with the first database. Various embodiments may further include executing a write transaction including assigning the write transaction a transaction identification number selected from a reserved range of numbers, and the reserve range of numbers consisting of numbers reserved from a larger range of numbers assigned to transactions in a second database, and committing the write transaction including associating a commit identification number with the write transaction such that the commit identification number is smaller than a global commit timestamp associated with the first database.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. As an example, the subject matter described herein may provide increased average throughput for a database system during high workloads to reduce the likelihood that a request to the database system for data may be queued, buffered or rejected until sufficient system resources are available to complete the request, by enabling work load distribution between a primary database system and a backup database system, without interfering with the high availability and disaster recovery (HA/DR) functionality of the backup database system. The subject matter described herein may allow write transactions to be executed upon a backup HA/DR database system without interfering with the HA/DR functionality of the HA/DR backup database system. The subject matter described herein may allow queries that involve both read and write transactions to be executed upon a backup HA/DR database system without interfering with the HA/Dr functionality of the HA/DR backup database system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a diagram illustrating one or more features in accordance with one or more embodiments described herein.

FIG. 8 is a diagram illustrating one or more features in accordance with one or more embodiments described herein.

Like reference symbols in the various drawings indicate like elements.

DETAILED DESCRIPTION

Figure 1:
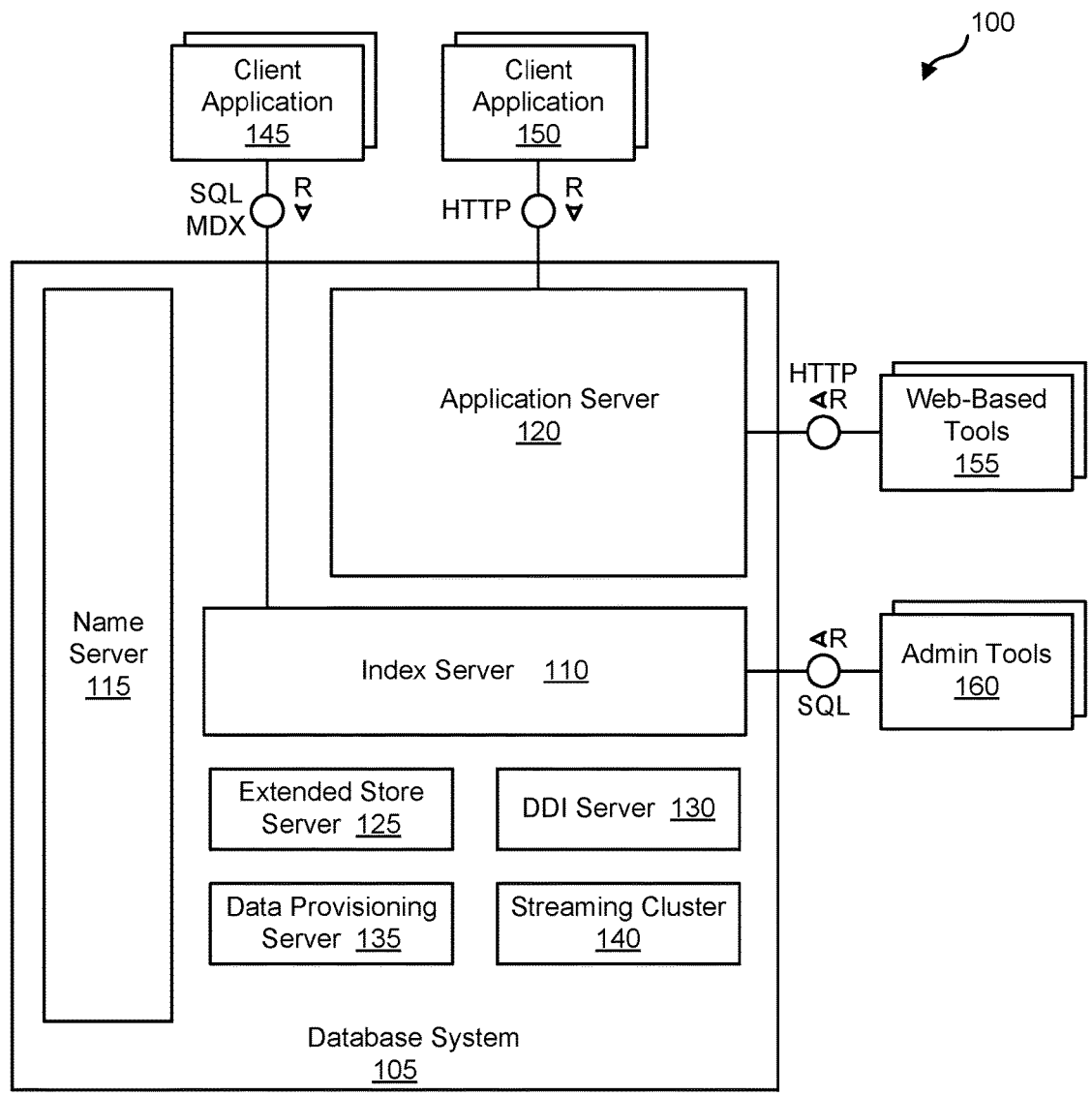
FIG. 1 is a system diagram illustrating an example database system for use in connection with the current subject matter.

A database or database system may be represented as a table or a set of tables, the tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in-memory database (IMDB) in which the data associated with the database is stored in main memory instead of disk storage so it may be accessed more quickly. IMDB systems are generally column oriented databases since column oriented databases make more efficient use of the expensive main memory Some databases may utilize replication to improve reliability and availability of the database. If data replication is implemented, the database system may include a first datacenter and a second datacenter. The first datacenter may include a processor and memory sufficient to store the data associated with the database. The first datacenter may store a first (primary) copy of the data associated with the database. The second datacenter may also include a processor and memory sufficient to store the data associated with the database. The second datacenter may store a second (backup) copy of the data associated with the database. In some implementations, the database may include more than two datacenters (e.g., three or four datacenters)

To better utilize the second (and subsequent) datacenter, some database systems, such as SAP HANA®, may simultaneously utilize the first datacenter and the second datacenter. In this mode of operation, the first datacenter may be configured to delegate queries to the second datacenter to balance the load between the two systems. Such a situation may be referred to as Active/Active (AA) operation since the first datacenter and the second datacenter both actively respond to queries at the same time.

The subject matter described herein discloses apparatus, systems, techniques and articles that may provide increased average throughput capabilities for a database system during high workloads to reduce the likelihood that a request to the database system for data may be queued, buffered or rejected until sufficient system resources are available to complete the request. In some examples, apparatus, systems, techniques and articles disclosed herein utilize secondary, backup database systems to execute queries to reduce the workload of a primary database system.

When a secondary, or backup, database system serves the purpose of HA/DR functionality, an apparatus, system, technique or article that utilizes a secondary, backup database system to increase throughput of a workload on a primary database system should not interfere with the HA/DR functionality of the backup system. The use of the backup database system to increase throughput should also maintain the backup database in substantially the same state as the primary database. In the event of primary database system failure, the backup database can assume the role of the primary database in as little time as possible. Therefore, transactions executed on a secondary database as part of such a load balancing scheme are prohibited from causing any changes to the backup database system, or at most they may have a minimal impact on the secondary database system. But, in some cases it is desirable to have the ability to execute certain write transactions on such a backup database, and so methods and systems of enabling writing to a backup database without interfering with the HA/DR functionality of the backup database are necessary.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
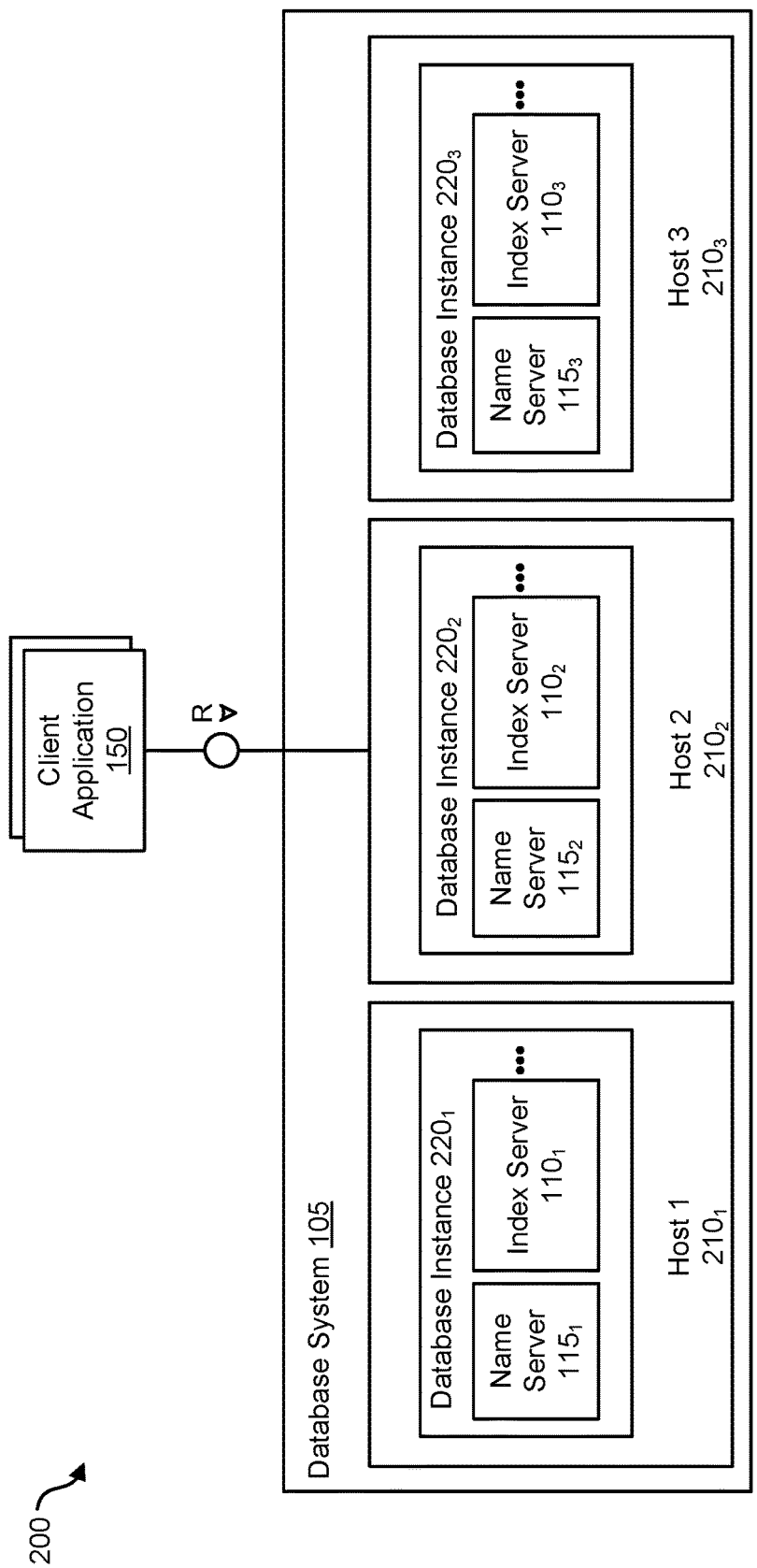
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $115_{1-3}$, index server $110_{1-3}$, and so on (other components are omitted to simplify the illustration).

Figure 3:
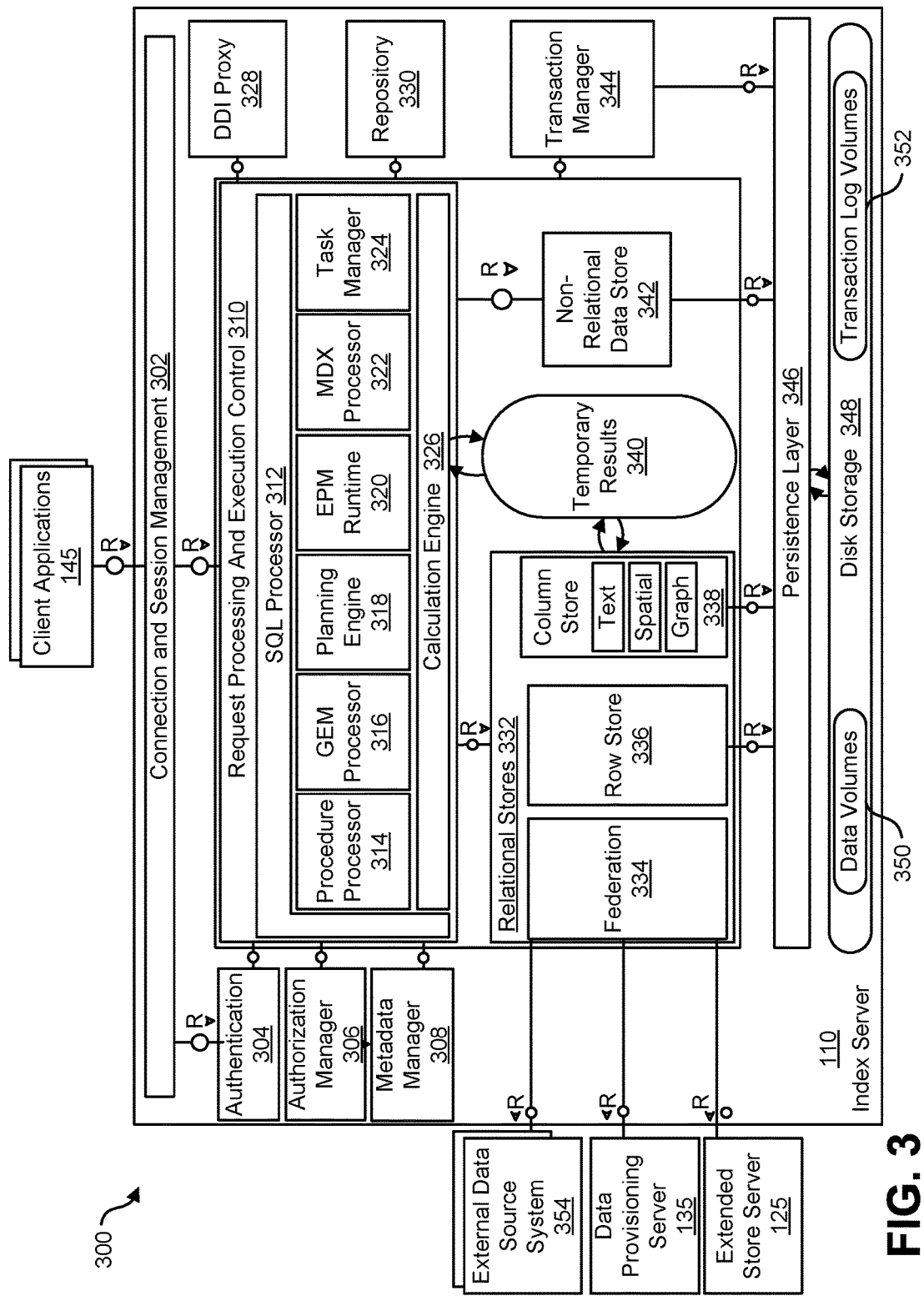
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 150 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects.

In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain data systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the HA/DR system to assume primary functionality in the event of a disaster.

Figure 4:
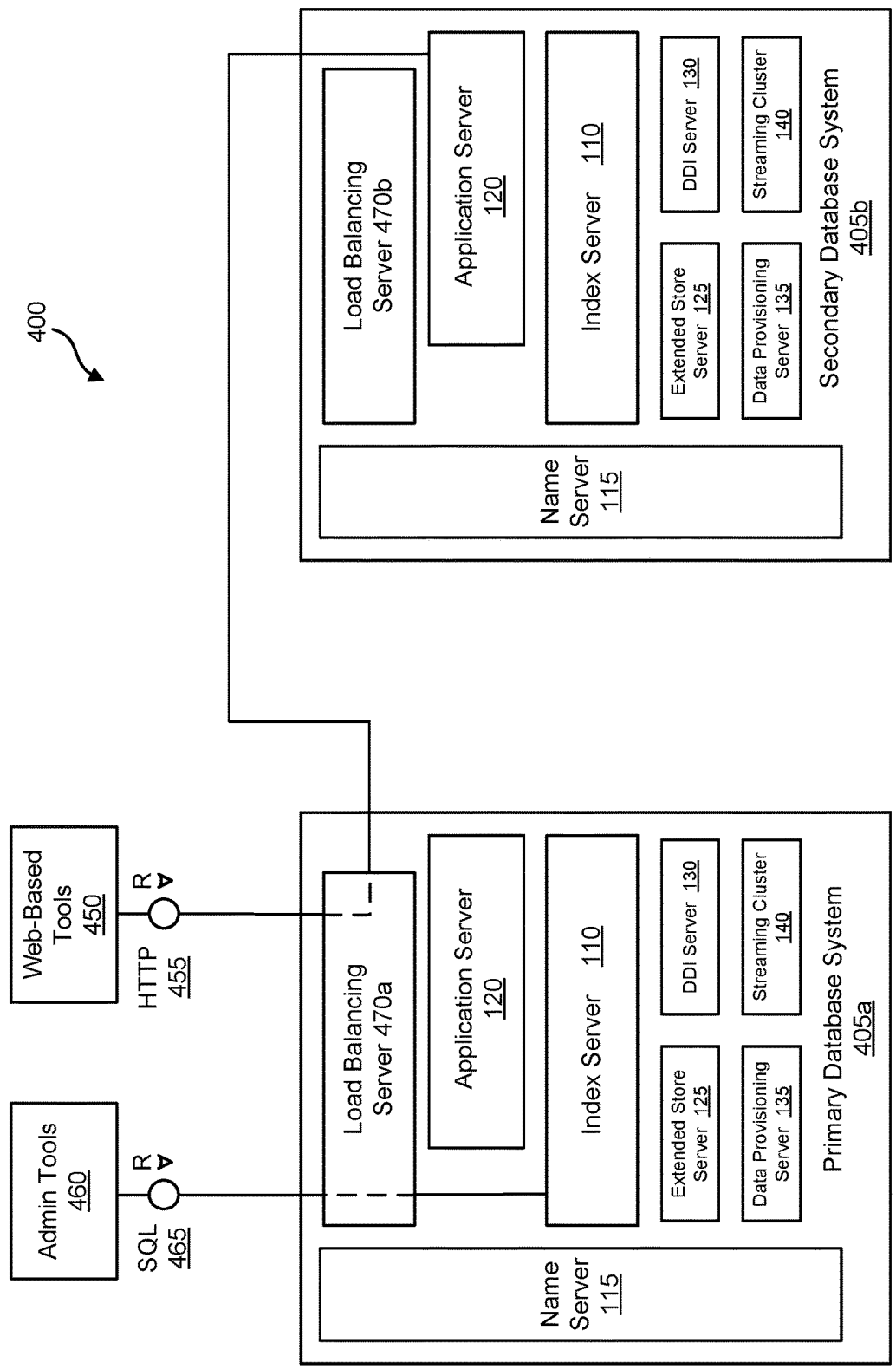
FIG. 4 is a diagram illustrating an architecture to support load balancing between a primary database system and a secondary database system, which serves as hot-standby to the primary database system, for use in connection with the current subject matter.

FIG. 4 is a diagram illustrating an architecture 400 to support load balancing between a primary database system, or primary system 405a and a secondary database system, or secondary system 405b, which serves as hot-standby to primary system 405a. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g. 465, may perform a write transaction that is followed by a read transaction, e.g. 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system should be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
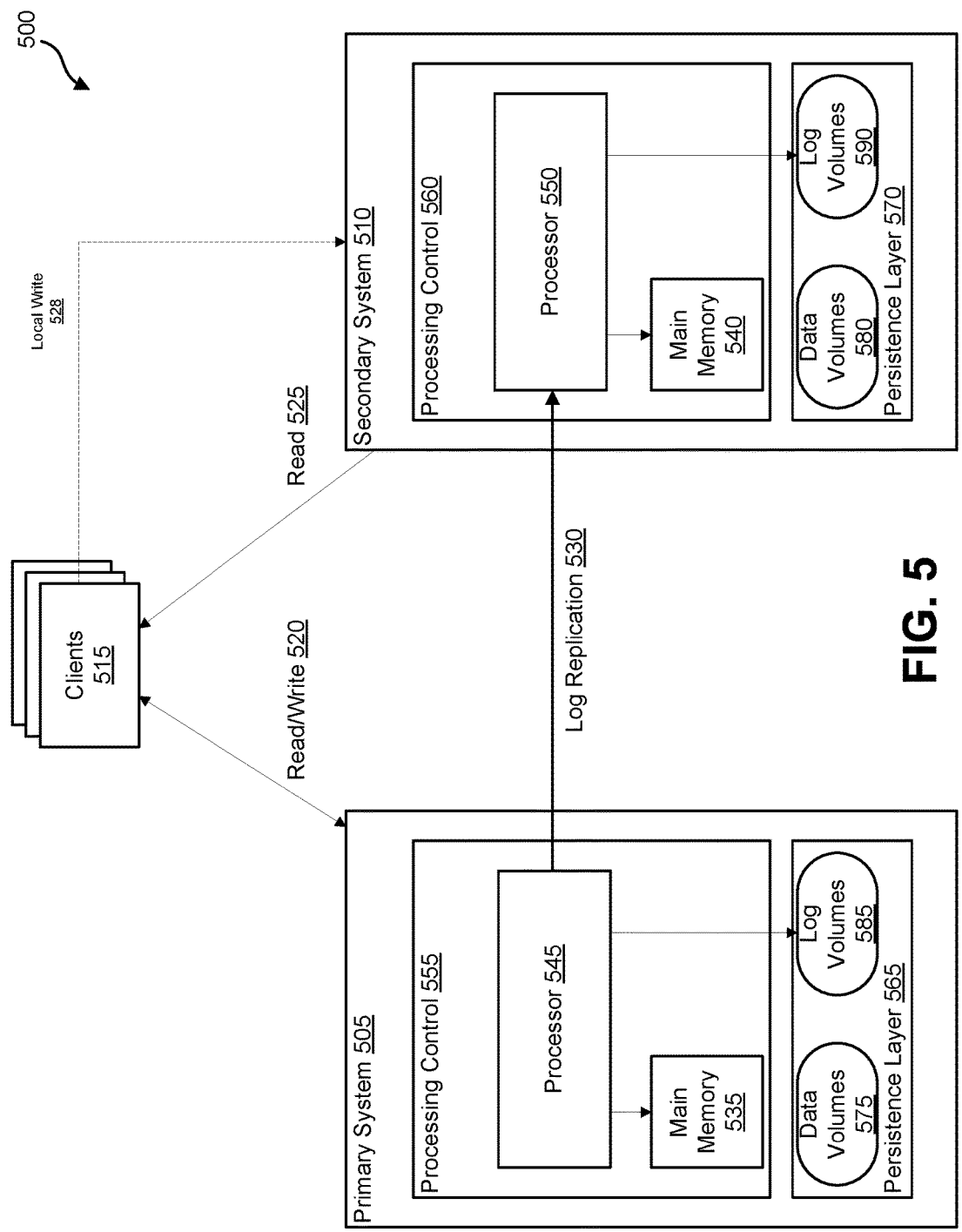
FIG. 5 is a diagram depicting one example solution to managing load balancing in a HA/DR system for use in connection with the current subject matter.

FIG. 5 depicts one possible solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 525. For example, client 515 maintains a read/write connection 520 to the primary system 505 and a read only connection 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A query request may include one or more of, among other things, a read transaction and a write transaction. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage.

Active operations of applications within processing control 555 may cause processor 545 to read and write data into main memory 535 or to disk in the persistence layer 565. Processing control 505 applications also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary system 505 may be the primary operational system for providing the various functionality necessary to support 24/7 operations for an organization. Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505.

Primary system 505 and secondary system 510 further differ in that all write transactions are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then continuously replay the transaction logs replicated from the primary system 505, thereby replaying the transactions at the secondary system 510. As transaction logs are continuously replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that such a secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515. Also, there is no guarantee that a query routed to the primary system in a load balancing effort will be executed before, during or after a particular transaction log is replayed. Thus, the state of the primary system 505 and the state of the secondary system will rarely if ever be identical. But, by addressing certain concerns, secondary system 510 may be kept in a state substantially close to the same state as the primary system 505 such that the workload required by many operations can be supported by the secondary 510. These are just a few of the issues to be addressed in order to provide a robust load balancing implementation in a HA/DR architecture, where the hot-standby system also functions to carry a portion of the workload. One or more solutions to issues arising by the load balancing solution depicted in FIG. 5 are now addressed.

As discussed above, when a secondary, or backup, database system serves the purpose of HA/DR functionality, an apparatus, system, technique or article that utilizes a secondary, backup database system to increase throughput of a workload on a primary database system should not interfere with the HA/DR functionality of the backup system. The use of the backup database system to increase throughput should also maintain the backup database in substantially the same state as the primary database. In the event of primary database system failure, the backup database can assume the role of the primary database in as little time as possible. Therefore, transactions executed on a secondary database as part of such a load balancing scheme are prohibited from causing any changes to the backup database system, or at most they may have a minimal impact on the secondary database system. But, in some cases it is desirable to have the ability to execute certain write transactions on such a backup database, and so methods and systems of enabling writing to a backup database without interfering with the HA/DR functionality of the backup database are desired.

Figure 6:
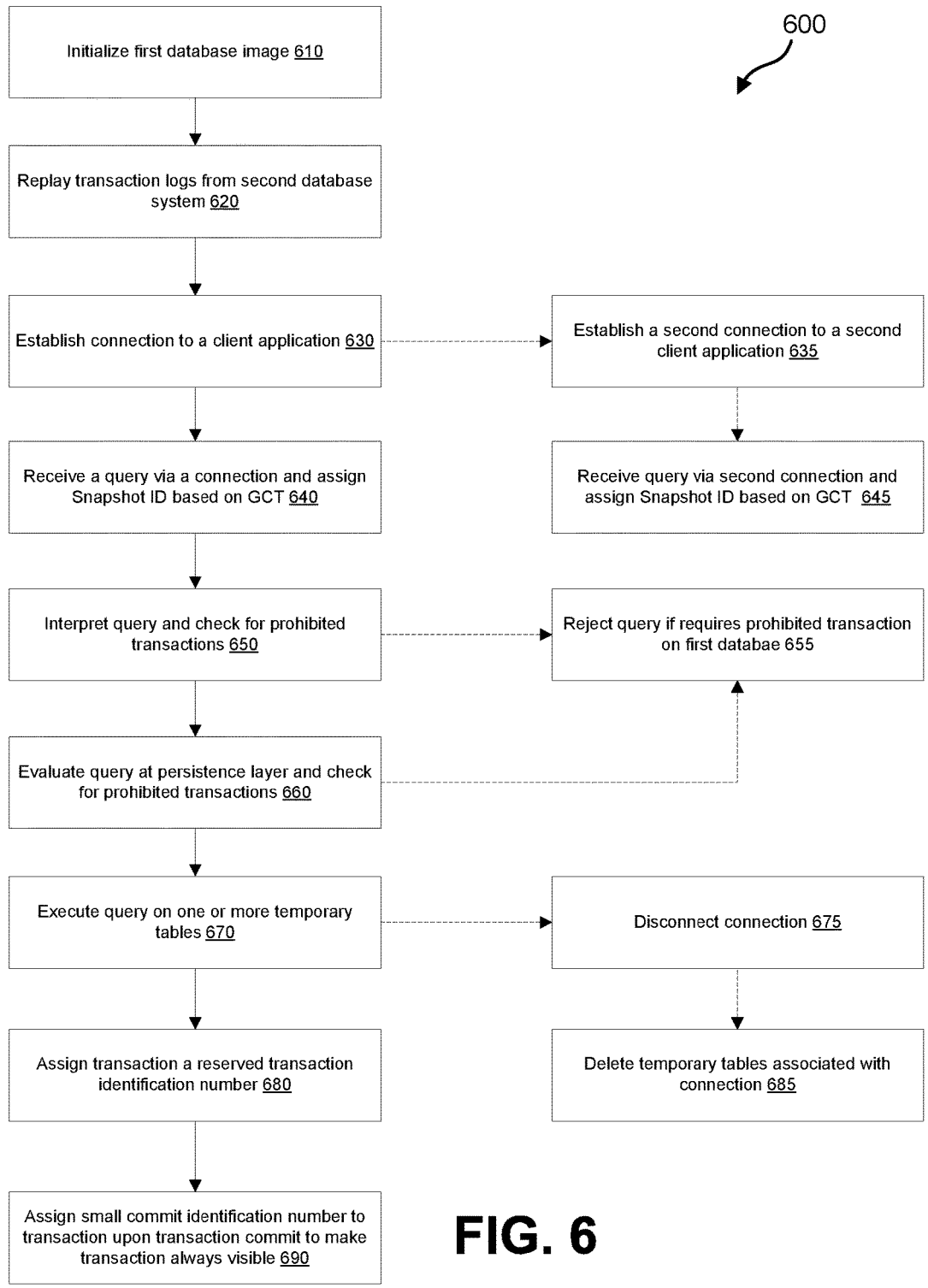
FIG. 6 is a flow chart depicting exemplary operation of a system or method for write access control in a secondary database for use in connection with the current subject matter.

FIG. 6 is a flow chart 600 depicting exemplary operation of a system or method for write access control in a secondary database for use in connection with the current subject matter. In some embodiments, the method may be performed by a secondary database system, for example 405*b* or 510. In operation 610, the database system initializes a first database image. The first database image may be an image held in memory, for example, in main memory 540. The first database image may be an image of a database, such that the image held in main memory may be an in-memory database. The database system initializes the first database image based on one or more images held in a persistent layer, for example persistence layer 570. The first database image may be initialized based on data from a data image, which may be maintained in a persistent data volume, for example data volume 580. The first database image may further be initialized based on one or more log records maintained in a persistent log volume, for example log volume 590.

Upon, or after, initialization of the first database image, the database system may operate as a backup system to a primary database system, for example primary system 405*a* or 505. As a backup system, the database system may primarily function as a HA/DR system, but may also accept queries in order to reduce a workload on the primary system. In order to serve as a backup system, and as a load balancing system, one or more processes executing on one or more processors, for example processor 550, operate to maintain the backup system in a state as close as possible to the state of the primary system. In order to perform its HA/DR, and to be useful for critical operations, the backup system should be in a near current state with regard to the primary system, meaning that transactions executed and committed to the primary database should be reflected in the secondary database as soon as possible. But, in one or more embodiments it is operationally sufficient that the backup database be substantially close to the current state of the primary database, so long as the backup system remains in a consistent state.

A consistent state is one in which a query on the secondary system will not return partial results from a transaction executed on the primary system. In other words, if part of a transaction is visible to a query made by a write transaction, then all other changes caused by that transaction should be visible to the query—this is referred to as visibility atomicity. A consistent state is also one in which when the results of a transaction are initially visible to a query, the same transaction results will be visible to the query until the query finishes. Likewise, once a query could not read a transaction's results, those results should remain invisible to the query until the query finishes—this is referred to as visibility stability. A consistent state is further one in which results from a second transaction executed upon the primary system after a first transaction will not be visible to a query on the backup database if the first transaction is not also visible, and once a transactions results are visible to a first query, they should remain visible to a later executed query. In other words, if a second transaction is committed after a first transaction is committed, and the second transaction's results are visible to a query, the first transaction's results should also be visible to the query—this is referred to as visibility monotonicity.

In one or more embodiments, to cause the state of the backup database system to mirrors the state of the primary database system, at operation 620 one or more processors 550 of the backup system continuously receive and replay transaction logs generated by the primary system. This replay continues while transactions are executed upon the primary database system and replicated to the backup system by log replication 530. These transaction logs may be, for example, redo logs which contain a record of changes or updates made to one or more database records. These transaction logs may also include commit logs, which cause one or more transactions prepared by replaying one or more redo logs to be committed. These transaction logs may also include savepoint logs, which are generated on a basis determined at a primary system. Replaying such savepoint logs causes the backup system to update a recovery image, e.g. 570, based on the in-memory database held in main memory 540, in order to cause the in-memory data to be written in a persistent state from which it may later be recovered.

Replaying transaction logs 620 from the primary database system by the processors of the backup system cause transactions, previously executed upon the primary system, to be reflected in the backup database system. Changes to the backup database system, caused by replaying transaction logs 620, should mirror changes to the primary system. Thus, if a transaction modifies the in-memory database held in main memory of the primary system 535, and one or more persistent records in the persistent layer of the primary 565 the secondary system should also be modified accordingly. This occurs upon replaying of the associated transaction logs by the secondary system 510. Replay of the transaction logs update the in-memory database held in main memory 540 of the backup system 510 and the persistent records in persistence layer 570 in the same manner as in the primary database system.

In operation 630 the backup database system establishes a connection with a client, for example client 515. The connection may be a read only connection 525, but the connection may optionally be a write enabled connection 528 for limited purposes. The backup database system may also establish a second connection to a second client in operation 635. In either case, the connection may be initiated by a client 515, or by a database system server. The client 515 may be executing one or more applications dependent upon the primary database as replicated in the backup database system. At process 640, the database system receives a query containing one or more transactions from the client via the connection. The system may assign the query a snapshot identification number, or snapshot ID, which is based on a global timestamp, which may be a global commit timestamp (or GCT). The GCT may enable a consistent response to the query, be establishing a window of visibility into the backup database, by limiting visibility to only those transactions committed to the database before the GCT. As mentioned above, while it is acceptable that the backup database system 510 is not in an identical state to the primary system 505, it is desirable that responses to query provide a consistent view of the data contained within the backup database.

In a primary database system, the GCT, or a snapshot ID based on the GCT, assigned to a query at the primary database system, may simply take the most recent commit timestamp generated upon the most recently committed transaction at the primary database system. However, where a backup database system is populated by the replay of transaction logs from a primary database system, additional consideration should be given to determine the visibility offered to a query, that is the snapshot ID provided to a client query at the backup database system.

As the data in the backup system is populated by the replay of transaction logs received from the primary system, as for example in process 620, the data populated in the backup system is populated in the order in which one or more transaction logs are generated at the primary system, e.g. 505, and subsequently received at the secondary system, e.g. 510. In various embodiments, transaction logs are generated as transactions are executed upon a primary database. Such transaction logs may be written into a single in-memory global buffer first, before being persisted by the log volume and subsequently shipped to a backup database for storing and replay replication. In this way, the order of transaction logs in the persistent storage of a primary and a backup system is ensured. Replay replication at the backup may, however, be done in parallel without controlling the order in which the transactions are replicated to the IMDB of the backup system. As a result, there may be little or no control over the order in which such transaction logs are replayed in operation 620.

Furthermore, replay of the transaction logs need not be performed in a serial order in which they are received, but instead may be allocated to one or more replay queues (not illustrated), such that they are replayed in parallel to optimize the speed of replay, while sacrificing any control over the order in which they are received. As it may be the case that neither a primary system nor the backup system controls the order of transaction log replication 530 and replay 620, it could be that more recently replayed transaction logs, and the data populated by them, may not be strictly in order when it is populated within the backup database. Thus, it is possible that changes to a first record in the backup database may complete before changes to a second record in the backup database, even though changes to both the first and second records occurred simultaneously in the primary database as a result of a single transaction. Therefore, a database system may employ one or more techniques for guaranteeing consistency by maintaining a timestamp record, or a GCT, indicating the most recent consistent view available to a client query received at process 640. The query received at process 640 is then issued a snapshot ID based upon the GCT. Although the GCT of a backup system may be somewhat delayed from the current associated primary system state, techniques may be employed to ensure that all transactions that began before the global commit timestamp have also been committed in all affected records as of the GCT, ensuring that the query does not return inconsistent results. Optionally, a second query may be received and assigned a Snapshop ID based on the then current GCT, which may be before or after the Snapshot ID assigned to the first query received in process 640.

At processes 650 and 660, the query received at process 640, may be evaluated to ensure that it does not require any prohibited transactions. Prohibited transactions in the backup system 510 may include any transactions that would modify, change, or update the in-memory image the first image initialized at process 610 and as modified by the replay of transaction logs at process 620. Other types of transactions may be prohibited based on the needs of the implementation and the dictates of the system architect.

Such exemplary prohibited transactions may also include any transaction that would modify, change, or update any recovery image, such as data volumes 580 and log volumes 590 in persistent layer 570. The query check can be performed in two or more layers of the backup system's processes. First, at process 650 the query may be interpreted or translated into, for example, an SQL statement, and the resulting SQL syntax may be evaluated to determine if the statement will cause a prohibited transaction. An example of a second layer check, at process 660, occurs in the logging layer processes, which inspect the resulting transaction to determine if the transaction will cause the generation of a redo log in the backup system. In either case, at process 650 and 660, or any other checks that may be implemented, if the query involves a prohibited transaction, at process 665 the query is rejected.

At process 670, the query is executed upon the backup database, e.g. secondary system 510. In the case that the query includes only a read transaction, the query executes and all consistent records relevant to the query as of the Snapshot ID assigned to the query are executed. Assuming the query received via the second connection at process 635 is also a read query, it will similarly receive a snapshot ID at process 645, and it will also undergo similar checks, e.g. similar to processes 650, 660, and will be executed in a similar manner as in process 670. But, at process 670, if a query involves a write transaction, the write transactions are executed upon one or more local temporary tables within the secondary database. Such local temporary tables are associated with a single connection, and are not visible to queries associated with separate connections, and are prohibited from causing any changes, modifications or updates to any recovery image, or persistent image, or the in-memory image of the backup database. Thus, at process 670, if the query received at process 640 includes a write transaction, one or more temporary tables are created, modified or the data contained therein is updated. But, the one or more temporary tables and their creation, modification or updates will not be visible to the query received at process 635.

Temporary tables may have all the same characteristics of other tables with the exception that they cannot change any persistent data (e.g. by generating redo logs, updating database images that can be included in a save point, or directly modifying persisted data), they are only visible to the connection in which they are created, and are destroyed when the connection is disconnected. Otherwise, temporary tables may support DDL operations and DML operations. Temporary tables may also support table locking operations, such as acquire table share lock and record exclusive lock when executing DML. Also, rollback of DML operations may be supported on a temporary table; and in the case of a distributed system, such DML operations may be supported on multiple index servers. Temporary tables may also support other global transactions in a distributed system.

At process 675, the connection may be disconnected from the backup database system, in which case all tables associated with the disconnected connection are deleted, or dropped, or destroyed, at process 685. It will be appreciated that this process 675 and associated process 685 may occur at anytime during the course of the sequences of process depicted in FIG. 6. For illustrative purposes process 675 is depicted as occurring after process 670 to highlight that temporary tables may be created in connection with a connection, and upon disconnection of the connection, the temporary tables associated with that connection are dropped.

A single query may cause multiple transactions. At process 680, the write transactions executed as a result of the query received at process 640 are assigned a transaction identification number. It will be appreciated that the ordering of the transaction execution and the assignment of a transaction ID may be reversed. A transaction ID is generally a number that identifies a transaction, which for example may be relied upon to locate a transaction in one or more transaction records or logs. It may also be used as a key to store in-memory undo logs entries and to trigger undo operations. In distributed system embodiments, for example, the distributed database system 105 variation depicted in FIG. 2, the transaction ID is utilized to locate the transaction in one or more remote nodes or one or more database instances $220_i$. Transaction IDs are also used in table and record level locking and as a key in in-memory structures.

In various embodiments, in the primary system, each transaction is a unique number, and for example may be an 8 byte binary representation of an integer, that is it may be between 0 and $2^{64}$. This range of numbers is sufficient to guarantee that each transaction ID is unique over the life of a database system. But, in a backup system, in which write transactions are limited to temporary tables, it may only be necessary that the transaction ID be unique during the runtime of a particular connection. So a relatively small range of numbers, for example the last 64,000 numbers in the range of numbers utilized by the primary system for transaction IDs, may be reserved from use in the primary system, and dedicated to use by the backup system for transactions executed on one or more temporary tables.

Once a transaction has executed at process 670, and a transaction ID has been assigned at process 680, a transaction may committed at process 690. As explained above, in the normal course of primary system operation, a commit ID is assigned to a transaction executed in the primary when the transaction is committed. The commit ID may be relied upon for visibility, for example when compared with a snapshot ID. When a transaction is replicated at the secondary by transaction log replay, e.g. at process 620, the transaction will be assigned whatever commit ID it was assigned at the primary system. At the secondary system, the GCT of the secondary may be incremented by one or more techniques that are based on the commit IDs of replicated transactions, and the receipt and replay of associated commit logs, e.g at process 620. As discussed above, according to various embodiments, a query returns all records having a commit timestamp that is less than the snapshot ID assigned to the query, where the snapshot ID is based on the then current secondary GCT when the query is received.

In the case of write transactions to local temporary tables in the secondary system, consistency is not an issue, because in embodiments (1) the transactions are not visible to any other connection, and (2) it is assumed that the client application executing the write transactions on the local temporary tables wants to see the transactions immediately. When a transaction is committed to a local temporary table, for example at process 690, the transaction may be assigned a commit ID that guarantees that the transaction will thereafter be always visible. Thus, a commit ID assigned to a transaction on a temporary table may simply take a predetermined value (e.g., a value representing the state "always visible"). Or, in the case where visibility is based on a comparison to a snapshot ID or GCT, the commit ID may take a very small value, where the very small value is guaranteed to be less than the backup system GCT or the snapshot ID.

FIG. 7 is a diagram 700 illustrating one or more features in accordance with one or more embodiments described herein. In particular, FIG. 7 depicts the flow of data during initialization of an image of a database held in memory, for example in-memory image 750. The flow of data depicted in FIG. 7 may, for example, be employed during process 610. In particular, one or more processors 710 execute one or more sub-processes such as initialization sub-process 760. Initialization sub-process 760 is retrieved from a persistent storage by processor 710 from a hard disk, or from disk storage 720. Initialization sub-process 760 can be retrieved during a system restart. Such a system restart may be used in the case of planned maintenance or after a disaster occurring at the secondary/backup system such as secondary system 510, which may employ initialization sub-process 760.

The initialization sub-process begins initializing the in-memory image 750 of an in-memory database. This initialization is based on one or more data images residing in data volume 730. Data volume 730 is stored in a persistent data volume as part of a persistence layer or recovery image 720 of a database system such as data volume 580 in persistence layer 570 of secondary system 510. Data volume 730 may include at least the most recent data captured from or stored by a database system's in-memory database during runtime. For example, a savepoint may be generated and stored in a persistent form during database runtime in the normal course of operations. Data stored in a persistent form, or simply persisted, is stored in a form that can survive a system crash, disaster or system restart. A savepoint may be created on a regular basis, for example every five minutes, during normal runtime operations. Alternatively, generation of a savepoint may be initiated by the replay of a savepoint log, by a backup system performing transaction log replay, for example during process 620.

As a system crash, or restart due to planned maintenance, may occur while one or more transactions remain open, it may also be the case that initialization sub-process relies on one or more logs, for example stored in a log volume recovery image 720. That is, based on the persisted data, and persisted transaction logs contained in a recovery image, the in-memory image 750 at the time of a crash is recovered by initialization sub-process 760 executing on processor 710. It will also be appreciated that recovery image 720 may alternatively be separate data images and log images, and may be stored in disparate locations or may be stored locally to processor 710.

FIG. 8 is a diagram illustrating one or more features in accordance with the one or more embodiments described herein. In particular, FIG. 8 depicts the flow of data during normal operations of a backup system implementing a transaction log replay scheme for transaction replication between a primary system, e.g. 505, and a backup system, e.g. 510. One or more processors in a backup database system, for example processor 810, may receive one or more processes from persistent disk storage, for example a hard drive, or from disk storage 825. These one or more processes may be, for example, a log replay process 860 that further interacts with one or more additional processes, for example replay savepoint log sub-process 865 and generate redo logs sub-process 866. As will be appreciated, these sub-processes may be a single sub-process or may include one or more additional sub-processes to effectuate the log replay scheme.

During normal operations, when the primary system is operating under normal conditions, and a backup system is providing HA/DR functionality of a primary system by replay of transaction logs, the primary system will execute various transactions in the primary database and accordingly generate transaction logs, such as transaction log 870. A transaction log, such as transaction log 870, may comprise one or more log entries comprising one or more redo log entries, commit log entries, pre-commit log entries, and/or savepoint log entries. Alternatively, a transaction log may be any one of distinct redo logs, commit logs, pre-commit logs, and/or savepoint logs. During normal operations, the primary system, for example 505, 405a, will periodically generate a savepoint.

A savepoint is created by capturing the in-memory image of the database in a persistent form, such that it will be available upon recovery from a restart or a system crash. A savepoint may, for example, be an on-disk representation, or image, of the in-memory image of the database. Because an IMDB maintains a large portion of the most actively accessed data in memory, most modifications to the IMDB, such as by update or insert statements, or the creation of tables, are often first carried out and committed to memory. These changes may not be reflected in a persistent, non-transient, store at the time of execution and at commit time. Instead, such modifications are persisted, or persistently stored, first through the generation and storage of transaction logs, for example in log volume 590 or 840, and second by the periodic storage of the in-memory image of the database by generation of a savepoint, for example in data volume 580 or 830. Together these volumes 580, 590 or 830, 840 may be considered a recovery image 820.

In a secondary or backup system, savepoints and transaction logs are generated by the replay of transaction logs received from the primary system. For example, processor 810 executing instructions comprising log replay sub-process 860 may receive a transaction log 870, which may include one or more redo log entries, and one or more commit log entries, and at least one savepoint log entry, each generated by the primary database system. When the processor 810 replays, by log replay sub-process 860, a redo log entry or a commit log entry of the transaction log 870, one or more modifications may be made to one or more records in the in-memory image 850 of the secondary system. These modifications to the in-memory image 850 also trigger the processor 810 to execute generate redo logs sub-process 866. Generate redo logs sub-process 866 generates new transaction logs and then modifies the recovery image 820, for example by storing the new transactions logs in log volume 840. In embodiments generate redo logs sub-process 866 copies the received transaction logs 870 into log volume 840, while in other embodiments generate redo logs sub-process 866 generates new redo logs based on the replay of received transaction logs 870. When the processor 810 replays, a savepoint log entry, this may for example initiate execution of another sub-process, replay savepoint log sub-process 865. Replay savepoint log sub-process 865 may cause the in-memory image 850 to be captured in an on-disk image, for example data image 830. In this way, replay savepoint log sub-process 865 modifies the recovery image 820.

Figure 9:
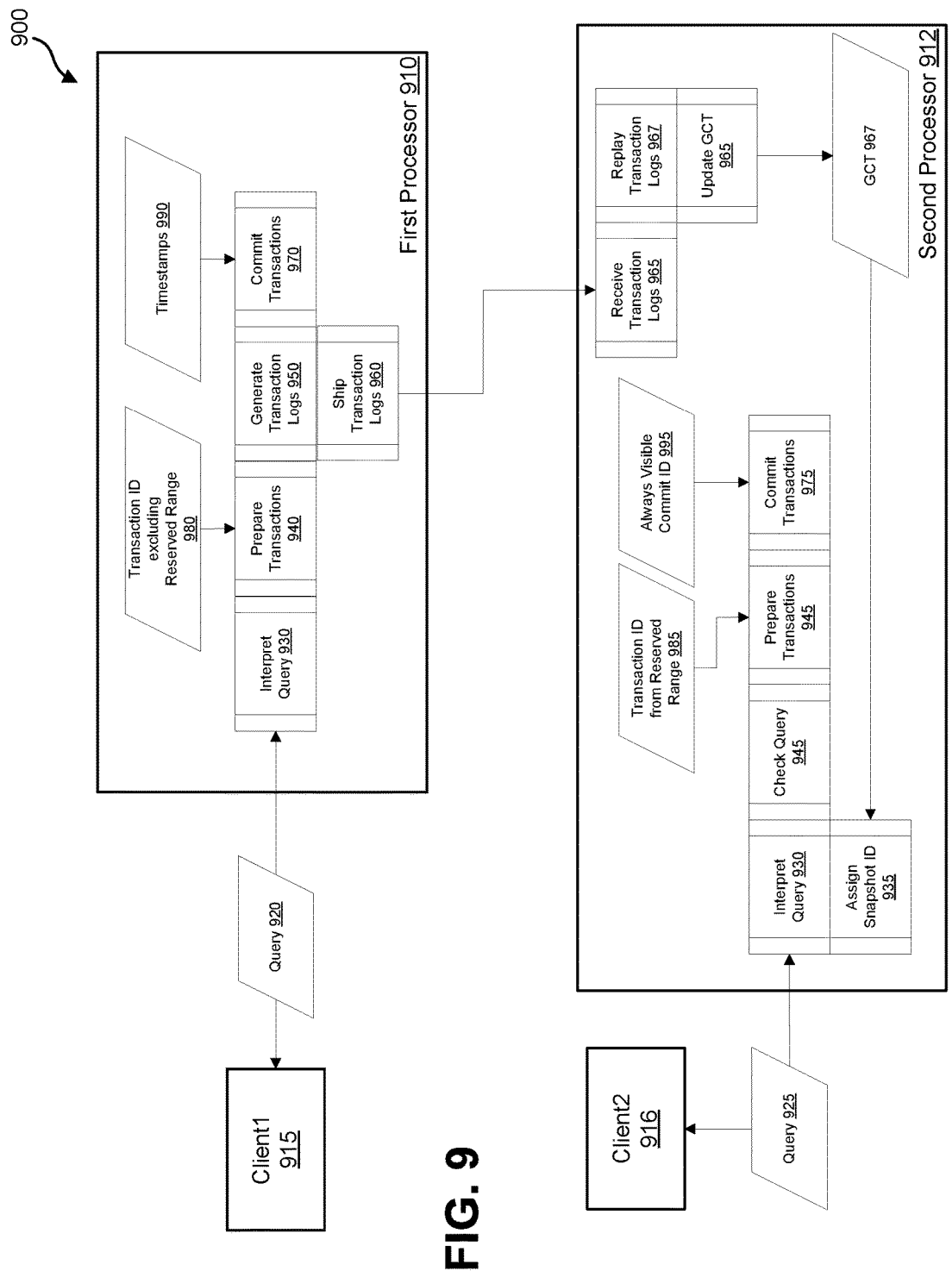
FIG. 9 is a diagram illustrating one or more features in accordance with one or more embodiments described herein.

FIG. 9 is a diagram illustrating one or more features in accordance with one or more embodiments described herein. In particular, FIG. 9 illustrates the flow of data during operations of a HA/DR system including a first processor 910, which may be part of a primary database system, and a second processor 912, which may be part of a backup database system and capable of supporting workload balancing between the primary and backup databases. First processor 910 may receive a query 920 from a client 915. Processor 910 may then interpret 930 the query 920 by preparing necessary SQL statements for execution, and prepare the necessary transactions 940 by creating one or more new versions of database records based on the transactions included in query 920 as interpreted by sub-process 930.

Prepare transaction sub-process 940 also receives, or generates, a transaction ID 980 to associate with the one or more versions, which may be associated in a transaction control block associated with the transaction ID 980. In order to enable write transactions on local temporary tables in the secondary system, transaction ID 980 is selected from a range of numbers from which a portion of the range is reserved for secondary local temporary table transactions. As prepare transaction sub-process 940 executes, generate transaction logs sub-process 950 may cause the processor to generate one or more transaction logs such as pre-commit logs, redo logs, or any other necessary logs. Once processor 910 is instructed to commit the transaction, commit transaction sub-process 970 may commit the transaction to the in-memory database and assign the transaction a commit ID, which may be derived from timestamp 990. Commit transaction sub-process 970 may also cause generate transaction logs sub-process 950 to generate a commit log. As transaction logs are generated by sub-process 950, ship transaction logs sub-process 960 sends the transaction logs to the second database system, and second processor 912 may execute one or more sub-processes for replaying transaction logs.

Replay transaction logs sub-process 967 may cause processor 912 to replicate the transaction initiated by query 920. In such a way the backup database is populated by the same transactions executed on the primary database. When replay transaction logs 967 replays a commit log, it causes update GCT sub-process 965 to update the GCT to the most recent commit log entry commit timestamp.

Second processor 912 may also receive a query 925 from a client 916. For exemplary purposes, query 925 includes both a read transaction and a write transaction. Upon receiving query 925, interpret query sub-process 930 causes second processor 912 to prepare one or more SQL statements, and may also obtain a snapshot ID from assign snapshot ID sub-process 935, which may derive the snapshot ID from the current GCT 967. Check query sub-process 945 performs a check on the prepared SQL statements to ensure that the transactions will not cause one or more prohibited action on the secondary database. Such prohibited actions include any transactions that will modify the IMDB, generate a transaction log, or modify the recovery image. These prohibited transactions would not be reflected in the primary system. Thus, the prohibited transactions would cause the secondary system to deviate from the state of the primary system, which undermine the HA/DR functionality of the system. Prepare transactions sub-process 945 then prepares a new transaction control block comprising one or more new versions of database records, and assigns a transaction ID from the reserved ranges 985, where the reserved range 985 includes the reserved portion of the range of transaction IDs utilized in the primary system.

The read transaction executed in response to query 925 will return all relevant records from the secondary database having a commit timestamp less than the snapshot ID assigned to the query by sub-process 935, where each record's commit timestamp is taken from the commit log entry as generated by the primary database system, and as replayed by replay transaction logs sub-process 967. The write transaction includes one or more transactions executed upon one or more temporary tables, and may be for example create table commands, update table commands, insert data commands, or modify data commands. Because write transactions are restricted to local temporary tables at the backup database system, the reserved range need only be a relatively small set of numbers when compared with the range utilized by the primary database system. The uniqueness of a transaction ID on a temporary table is only necessary during the life of the client connection, because (1) temporary tables are only visible to their associated connections, and (2) temporary tables are destroyed, or dropped, upon disconnection of the connection.

Each such transaction having an assigned transaction ID, when committed by commit transactions sub-process 975 will be committed to one or more temporary tables, which may be held in memory but logically distinct from the IMDB in-memory image of the backup database. Commit transaction sub-process 975 will further assign the transaction a commit ID 995, which may be a predetermine value that indicates a transaction is "always visible." Making the transaction always visible, may alternatively be accomplished by generating and assigning a commit ID that is relatively small, where the relatively small commit ID is guaranteed to be less than GCT 967. In various embodiments, GCT is a value representing an epoch time such as 1479269465, a value representing 11:11:05 PM on Nov. 15, 2016. For example, a relatively small value guaranteeing that a particular associated transaction is always visible is 0000000002, or 0079269465, in a system that assigns commit IDs in epoch time.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
    initializing a first image of a first database from a recovery image;
    modifying the first image of the first database by replaying transaction logs of a second database;
    establishing a connection with a client;
    receiving a query via the connection, the query including a transaction to be executed on the first database; and
    rejecting the query when the transaction comprising a write operation causes any one of:
        updating of the first image of the first database;
        generating a new transaction log; and
        modifying the recovery image,
    wherein the recovery image is updated during runtime in response to replay of a savepoint log when replaying transaction logs of the second database, wherein the recovery image includes one or more data images and one or more log images, further wherein the one or more data images are updated during database runtime based on the first image of the first database, and the one or more log images are updated when new transaction logs are received from the second database.

2. The computer implemented method of claim 1, further comprising:
    executing the query, wherein when the query includes a write transaction executing the query causes one of:
        creating one or more temporary tables in the first database associated with the connection;
        modifying one or more temporary tables of the first database associated with the connection; and
        modifying the data contained within one or more temporary tables of the first database; and
    assigning, when the write transaction is executed on one or more temporary tables, a small value to the transaction commit timestamp associated with the write transaction, wherein the small number is guaranteed to be smaller than a global commit time stamp,
    wherein visibility of the write transaction to a later executed query in the first database is at least in part determined by whether a transaction commit timestamp associated with the write transaction is less than a global commit timestamp of the first database.

3. The computer implemented method of claim 2, further comprising establishing a second connection with a second client, wherein the temporary tables of the first database associated with the connection are not visible to queries associated with the second connection.

4. The computer implemented method of claim 3, further comprising deleting any temporary tables of the first database associated with the connection when the connection is disconnected.

5. The computer implemented method of claim 4, wherein temporary tables of the first database associated with the connection are maintained until a time substantially concomitant with the connection being disconnected, further wherein the temporary tables are logically distinct from the first image of the first database, further wherein transactions executed on any temporary table associated with any connection are prohibited from causing any modification of any recovery image associated with the first database.

6. The computer implemented method of claim 1, wherein replaying transaction logs of the second database includes replicating transactions executed in the second database, wherein each replicated transaction has an associated transaction identification number assigned by the second database from a range of numbers, the method further comprising:
    reserving a portion of the range of numbers to serve as temporary table transaction identification numbers in the first database; and
    assigning a reserved transaction identification number selected from the portion of the range of numbers to a write transaction executed on one or more temporary tables associated with the connection;

deleting the one or more temporary tables of the first database associated with the connection when the connection is disconnected; and assigning the reserved transaction identification number to a second transaction associated with a second connection after deleting the one or more temporary tables of the first database associated with the connection.

7. The computer implemented method of claim 1, wherein the transaction logs comprise one or more log entries having one or more redo log entries, one or more commit log entries, one or more pre-commit log entries, or one or more savepoint log entries.

8. The computer implemented method of claim 1, wherein the replaying transaction logs comprises replaying a first transaction log and a second transaction log in parallel.

9. A system comprising:
at least one processor; and
a non-transitory computer readable media having computer executable instructions stored therein, which, when executed by the processor, causes the system to perform operations comprising:
initializing a first image of a first database from a recovery image;
modifying the first image of the first database by replaying transaction logs of a second database;
establishing a connection with a client;
receiving a query via the connection, the query including a transaction to be executed on the first database; and
rejecting the query when the transaction comprising a write operation causes any one of:
updating of the first image of the first database;
generating a new transaction log; and
modifying the recovery image,
wherein the recovery image is updated during runtime in response to replay of a savepoint log when replaying transaction logs of the second database, wherein the recovery image includes one or more data images and one or more log images, further wherein the one or more data images are updated during database runtime based on the first image of the first database, and the one or more log images are updated when new transaction logs are received from the second database.

10. The system of claim 9, wherein the operations further comprise:
executing the query, wherein when the query includes a write transaction executing the query causes one of:
creating one or more temporary tables in the first database associated with the connection;
modifying one or more temporary tables of the first database associated with the connection; and
modifying the data contained within one or more temporary tables of the first database; and
assigning, when the write transaction is executed on one or more temporary tables, a small value to the transaction commit timestamp associated with the write transaction, wherein the small number is guaranteed to be smaller than a global commit time stamp,
wherein visibility of the write transaction to a later executed query in the first database is at least in part determined by whether a transaction commit timestamp associated with the write transaction is less than a global commit timestamp of the first database.

11. The system of claim 10, wherein the operations further comprise establishing a second connection with a second client, wherein the temporary tables of the first database associated with the connection are not visible to queries associated with the second connection.

12. The system of claim 11, wherein the operations further comprise deleting any temporary tables of the first database associated with the connection when the connection is disconnected.

13. The system of claim 12, wherein temporary tables of the first database associated with the connection are maintained until a time substantially concomitant with the connection being disconnected, further wherein the temporary tables are logically distinct from the first image of the first database, further wherein transactions executed on any temporary table associated with any connection are prohibited from causing any modification of any recovery image associated with the first database.

14. The system of claim 9, wherein replaying transaction logs of the second database includes replicating transactions executed in the second database, wherein each replicating transaction has an associated transaction identification number selected by the second database from a range of numbers, the operations further comprising:
reserving, at the second database, a portion of the range of numbers to serve as temporary table transaction identification numbers in the first database; and
assigning a reserved transaction identification number selected from the portion of the range of numbers to a write transaction executed on one or more temporary tables associated with a connection; and
deleting the one or more temporary tables of the first database associated with the connection when the connection is disconnected; and
assigning the reserved transaction identification number to a second transaction associated with a second connection after deleting the one or more temporary tables of the first database associated with the connection.

15. A non-transitory computer readable storage medium embodying programming instructions for performing a method, the method comprising:
initializing a first image of a first database from a recovery image;
modifying the first image of the first database by replaying transaction logs of a second database;
establishing a connection with a client;
receiving a query via the connection, the query including a transaction to be executed on the first database; and
rejecting the query when the transaction comprising a write operation causes any one of:
updating of the first image of the first database;
generating a new transaction log; and
modifying the recovery image,
wherein the recovery image is updated during runtime in response to replay of a savepoint log when replaying transaction logs of the second database, wherein the recovery image includes one or more data images and one or more log images, further wherein the one or more data images are updated during database runtime based on the first image of the first database, and the one or more log images are updated when new transaction logs are received from the second database.

16. The non-transitory computer readable storage medium embodying programming instructions for performing a method of claim 15, the method further comprising:
executing the query, wherein when the query includes a write transaction executing the query causes one of:
creating one or more temporary tables in the first database associated with the connection;

modifying one or more temporary tables of the first database associated with the connection; and modifying the data contained within one or more temporary tables of the first database; and assigning, when the write transaction is executed on one or more temporary tables, a small value to the transaction commit timestamp associated with the write transaction, wherein the small number is guaranteed to be smaller than a global commit time stamp, wherein visibility of the write transaction to a later executed query in the first database is at least in part determined by whether a transaction commit timestamp associated with the write transaction is less than a global commit timestamp of the first database.

17. The non-transitory computer readable storage medium embodying programming instructions for performing a method of claim 16, the method further comprising establishing a second connection with a second client, wherein the temporary tables of the first database associated with the connection are not visible to queries associated with the second connection.

18. The non-transitory computer readable storage medium embodying programming instructions for performing a method of claim 17, the method further comprising deleting any temporary tables of the first database associated with the connection when the connection is disconnected.

19. The non-transitory computer readable storage medium embodying programming instructions for performing a method of claim 18, wherein temporary tables of the first database associated with the connection are maintained until a time substantially concomitant with the connection being disconnected, further wherein the temporary tables are logically distinct from the first image of the first database, further wherein transactions executed on any temporary table associated with any connection are prohibited from causing any modification of any recovery image associated with the first database.

20. The non-transitory computer readable storage medium embodying programming instructions for performing a method of claim 15, wherein replaying transaction logs of the second database includes replicating transactions executed in the second database, wherein each replicating transaction has an associated transaction identification number selected by the second database from a range of numbers, the method further comprising:

Reserving, at the second database, a portion of the range of numbers to serve as temporary table transaction identification numbers in the first database; and assigning a reserved transaction identification number selected from the portion of the range of numbers to a write transaction executed on one or more temporary tables associated with the connection;

deleting the one or more temporary tables of the first database associated with the connection when the connection is disconnected; and assigning the reserved transaction identification number to a second transaction associated with a second connection after deleting the one or more temporary tables of the first database associated with the connection.

* * * * *